United States Patent

[11] 3,598,389

[72] Inventor Robert Kohler
 Schongau, (Lech), Upper Bavaria, Germany
[21] Appl. No. 794,692
[22] Filed Jan. 28, 1969
[45] Patented Aug. 10, 1971
[73] Assignee Hoerbiger Ventilwerke Aktiengesellschaft
 Vienna, Austria
[32] Priority Jan. 31, 1968
[33] Austria
[31] A940/68

[54] SPRING DISC FOR A MULTIRING VALVE
 7 Claims, 7 Drawing Figs.
[52] U.S. Cl. .................................................. 267/161
[51] Int. Cl. .......................................... F16f 1/34
[50] Field of Search ........................................ 267/161, 163, 158, 159

[56] References Cited
UNITED STATES PATENTS

| 3,239,804 | 3/1966 | Elskamp et al. | 267/1 (61) |
| 3,344,397 | 9/1967 | Elliott et al. | 267/1 (63) |

*Primary Examiner*—James B. Marbert
*Attorney*—Watson, Cole, Grindle & Watson

ABSTRACT: A spring disc for a multiring valve, the disc having concentric disc rings connected together by radial webs, all webs being arranged substantially on one diameter of the spring disc, while the disc itself is curved.

PATENTED AUG 10 1971 3,598,389
SHEET 1 OF 2
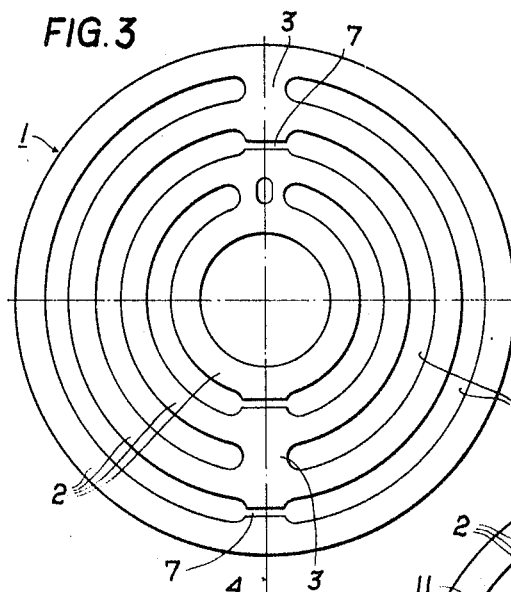
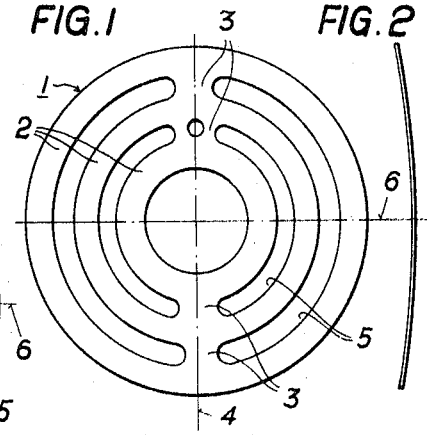
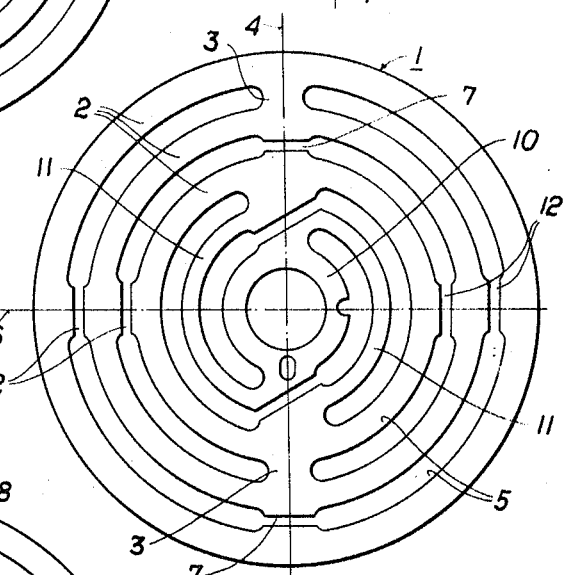
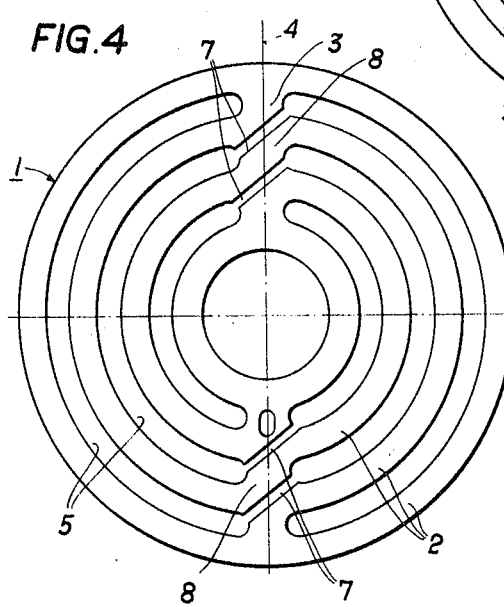
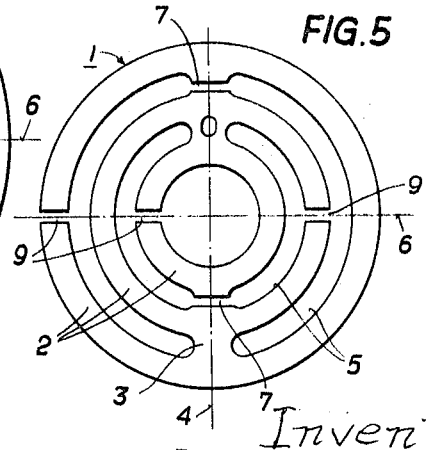
Inventor
Robert Köhler
By Watson Cole Grindle & Watson
Attys.

INVENTOR
ROBERT KOHLER

SPRING DISC FOR A MULTIRING VALVE

BACKGROUND OF THE INVENTION

Various designs of spring discs to act as springs on the closure plates of multiring valves, as used predominantly as intake and delivery valves of piston compressors, are known, for instance, discs with spring tongues bent out of the disc surface, discs with a dish-shaped curvature or with cylindrical curvature. In the case of cylindrically curved spring discs the method of connecting the concentric disc rings to each other by not more than two webs, all webs being arranged on the same disc diameter, and making the cylindrical curvature so that the axis of the curvature is parallel to the disc diameter passing through the webs, is also known. This design is relatively simple to manufacture. On account of the considerable reduction in the amount of the material left between the disc rings in form of webs and the special curvature of the disc, where the web diameter remains uncurved, any internal stresses remaining from the manufacturing process are neutralized and the bending stresses are also largely reduced.

In all known spring discs, including the cylindrical curved discs with webs on a single disc diameter, the spring arms or ring sections performing the spring work start at radial webs of the disc, these webs being practically free from deformation during the working of the valve. It is accordingly true that the webs themselves are not subjected to very severe stresses, but maximum bending stresses occur at the roots of the springs, formed by the transitions between the webs and the spring rings. In the known types, these spring roots are susceptible to fracture since in the area of the roots changes in the cross section of the spring parts of the disc are unavoidable, as the spring parts of the disc blend into the webs, so that the discs may fracture at these points, under onerous working conditions.

SUMMARY OF THE INVENTION

The present invention provides a spring disc for a multiring valve the disc comprising concentric rings connected together by radial webs, arranged substantially on one diameter of the disc, and the disc being curved about another diameter in which is substantially at right angles to said one diameter.

With this arrangement, changes in cross section at the most highly stressed parts, near the axis of curvature, are avoided so that the spring disc according to the invention has practically no parts subject to critical stresses. The disc shape according to the invention is also easy to manufacture. Also, practically the entire disc surface is utilized for spring work, and a largely symmetrical distribution of the spring forces is achieved.

Since the radial webs between the concentric disc rings are also curved, the spring disc according to the invention is stiffer than the known types of disc springs with the axis of curvature parallel to the web diameter, assuming that the thicknesses of the discs are the same. According to a further feature of the invention, the stiffness can be reduced by providing a cut at least at one point of the spring disc diameter passing through the webs, this cut interrupting the radial connection between the disc rings. This largely avoids curvature of the webs, and achieves a reduction of the stresses in the material at these points. Since also the spring stiffness is largely reduced, the disc thickness can be increased without any disadvantageous increase of the spring force so that the safety with respect to fracture is correspondingly improved. By providing cuts in the neighborhood of the web diameter, all rings are supported in this neighborhood directly on the supporting faces of the spring disc and thus become more fully effective.

A preferred embodiment of the invention consists in that each alternate web on opposite sides of said another diameter is cut between the disc rings.

The cut may be perpendicular to the web diameter. The cuts on opposite sides of the disc are between different disc rings. However, the cuts can also be made inclined with respect to the said another diameter through the disc rings, the disc being divided into ring halves, so that the ring halves of adjacent rings are connected together through inclined bridges. In this way, all inner disc rings can be divided so that only the outermost and preferably also the innermost disc ring remain without cuts.

The stiffness of the spring disc according to the invention can be further reduced by radial cuts, according to a further feature of the invention, these radial cuts cutting the concentric disc rings at points between the webs, in the circumferential direction. These radial cuts are preferably arranged on said another diameter. In order to maintain the connection between the individual disc rings, each disc ring is given only a single radial cut, and the radial cuts of consecutive rings are made alternately on diametrically opposite sides of the disc. This arrangement constitutes a well loosened spring disc which is easy to make and has a high safety against fracture because there are no points under high stress and on account of the low stiffness of the disc it can be made from heavy gauge material without exceeding the spring force required in any given case.

The spring disc according to the invention can be made to slide, or can be made in a known manner with a hub having elastic guide arms leading to the innermost disc ring, the disc being adapted to be clamped in the valve by means of the hub. If the central part of the disc is adequately loosened by separating cuts, the innermost disc ring can also be firmly clamped, no special guiding arms being required in this case. Spring discs according to the invention can be used in all common types of valves for loading any kind of closure disc.

BRIEF DESCRIPTION OF THE DRAWING

The accompanying drawings show some embodiments of the invention by way of example.

FIG. 1 is a plan view of a spring disc according to the invention,

FIG. 2 is a side view of the disc shown in FIGS. 1, 3, 4, 5 and 6 each show a plan view of further forms of discs according to the invention, the curvature of the discs having been disregarded in these illustrations in order to simplify the diagrams.

DESCRIPTION OF THE PREFERRED EMBODIMENTS

Figure 7:
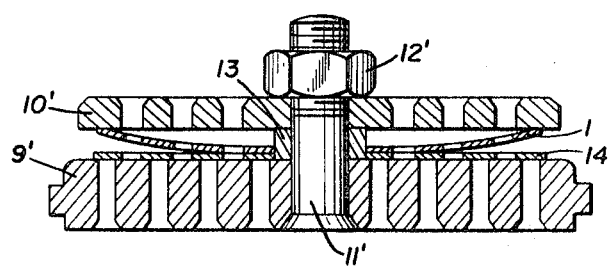
FIG. 7 is a cross section of the complete valve.

In all embodiments, the spring disc is numbered 1 and consists of several concentric rings 2, connected together by radial webs 3. All webs 3 are arranged substantially on the same diameter 4 of the spring disc 1. Passage slots 5 are arranged between the rings 2 for the passage of the controlled medium through the spring disc 1. All spring discs 1 shown here are curved to form a cylindrical surface about a diameter 6 at right angles to the diameter 4 passing through the webs 3, as shown in Figs. 1 and 2. In this way, excessive bending stresses in the spring disc 1 are avoided in the neighborhood of the webs 3. The highest bending stresses are found in or near the diameter 6, but in this area there are no disadvantageous changes in cross section in the disc. At all the most severely stressed parts of the disc there are comparatively long ring sections capable of moving freely through the adjacent rings so that any internal stresses can be neutralized, and excessive bending stresses are avoided.

In the embodiments according to FIGS. 3 to 6, cuts 7 are arranged along the web diameter 4, these cuts interrupting the radial connection formed by the webs 3 between the disc rings 2, according to FIG. 1. In FIGS. 3, 5, and 6, the cuts 7 are perpendicular to the web diameter 4. Starting from the disc center, each alternate web 3 is cut, the cuts 7 on opposite sides of the disc center being between different disc rings 2 so that all rings 2 of the spring disc 1 remain connected together. The adjacent rings 2 are connected together by a single web 3. In FIG. 4 however, the cuts 7 are arranged inclined to the web diameter 6 and pass the disc rings 2, dividing them into ring halves. Bridges 8 inclined with respect to the web diameter 4 remain between the cuts 7 and connect together the ring halves of adjacent rings, so that also in this arrangement the individual disc rings 2 still remain connected together. It is convenient not to cut the rings 2 on the inner and outer edges of the spring disc 1.

With the loosening of the plate by means of the cuts 7, leaving between the rings 2 only the web connections essential for keeping the parts of the disc together, any critical bending stresses in the neighborhood of the webs 3 are almost entirely avoided, and the stiffness of the spring disc 1 is also reduced. In order to make the disc even softer, radial cuts 9 are provided, according to Fig. 5, in addition to the cuts 7, these radial cuts 9 passing through a part of the disc rings 2. The radial cuts 9 are in the circumferential direction between the webs 3 and the axis 6 of the cylindrical curvature of the spring disc 1. Each disc ring 2 is given only a single radial cut 9, the radial cuts of consecutive rings 2 being made alternately on either side of the disc center so that not only the disc rings 2 remain fixed together, but also unilateral spring action is avoided, as far as possible.

The spring disc 1 shown in Fig. 6 is designed so that it can be guided substantially without friction. It is equipped for this purpose with a hub 10 from which elastic guide arms 11 lead to the innermost disc ring 2. The spring disc 1 can be firmly clamped in a valve by means of the hub 10. On account of the loosening of the spring discs according to the invention by cuts 7, however, the other disc shapes shown here can also be firmly clamped in the valve, in particular the arrangement shown in Fig. 4, where the innermost disc ring is clamped and no special guiding arms are needed. Moreover, Fig. 6 shows that this embodiment is made from a type of disc with webs on two different diameters. But all webs originally present in the axis 6 of curvature are now cut open by comparatively wide cuts 12 so that practically the same type of disc is obtained as in the case of the embodiment according to Fig. 3.

FIG. 7 shows the complete valve according to the invention having a spring plate as shown in FIG. 1 of applicant's U.S. Pat. No. 3,265,085, issued Aug. 9, 1966. The ring valve shown in FIG. 7 comprises a valve seat 9' and a valve guard 10', both members being centered and positively attached to each other by means of a bolt 11' and a nut 12'. Between the valve seat 9' and the valve guard 10', a washer 5' is provided, which determines the distance between the said members and also serves as a guide for the valve plate 14 and the spring plate 5' loading the former.

The embodiments of the spring disc according to the invention, shown here only by way of example, indicate that many different types of discs can be made by combining and varying the features illustrated here, within the frame of the invention. The only important feature required according to the invention is that the disc rings are connected together by webs substantially on a single disc diameter and the disc is curved in such a way that the axis of curvature is transverse to the diameter of the spring disc passing through the webs. The cuts through the webs and the disc rings serve the purpose of loosening the disc, and to reduce the spring stiffness, but are not essential.

I claim:

1. A spring disc for a multiring valve comprising concentric rings and radial webs with the rings connected together by the radial webs, said webs being arranged substantially on one diameter of the disc, and the disc being curved about another diameter which is substantially at right angles to said one diameter.

2. A spring disc according to claim 1 having at least one cut through web between a pair of rings substantially on said one diameter.

3. A spring disc according to claim 1 having, in which is provided a cut through a web between each successive pair of rings, the cuts being formed alternately on opposite sides of said second-mentioned diameter.

4. A spring disc according to claim 1, having at least one cut through web between a pair of rings substantially on said one diameter, and in which each cut is inclined to said another diameter.

5. A spring disc according to claim 1, in which at least one of the concentric disc rings is radially cut at a position between the webs.

6. A spring disc according to claim 1, in which at least one of the concentric disc rings is radially cut at a position between the webs and in which the radial cut lies substantially on another diameter.

7. A spring disc according to claim 1 in which each disc ring has a radial cut, said radial cuts of successive rings alternating on opposite sides of said one diameter.